Feb. 13, 1940.    E. M. STAPLES    2,190,492
EXPANSIBLE CUTTER
Filed July 15, 1938
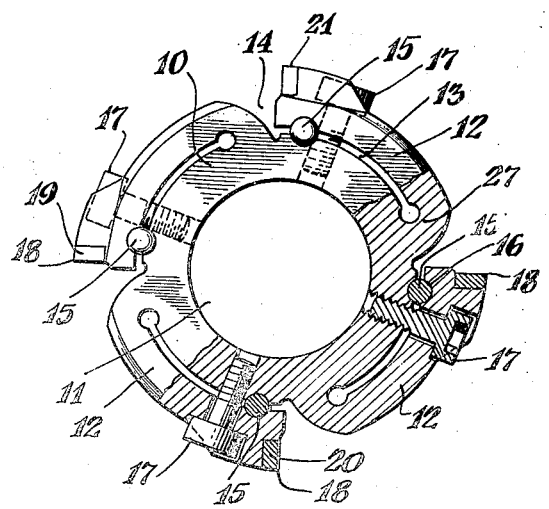
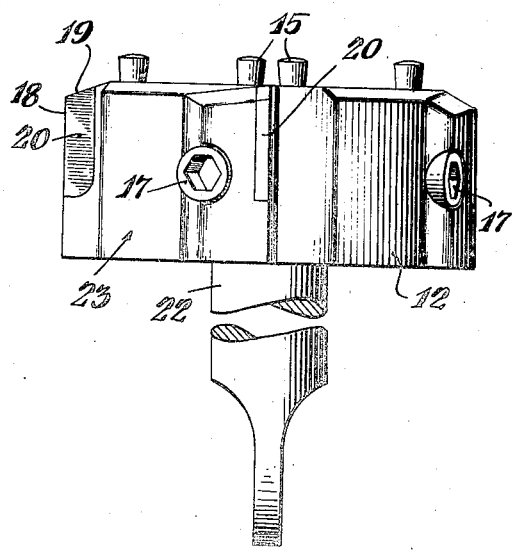
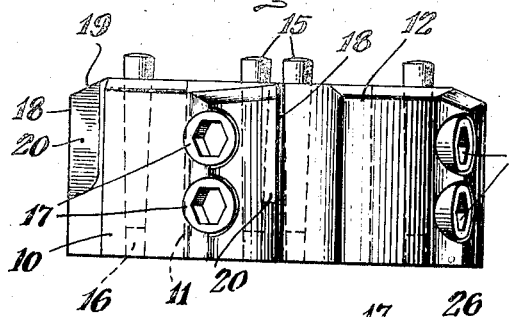
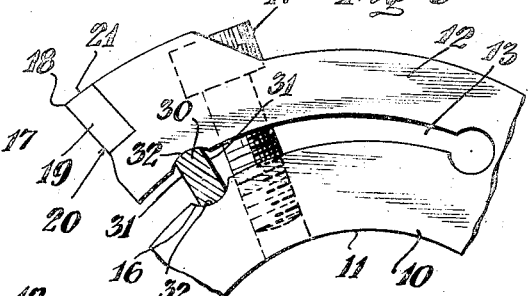
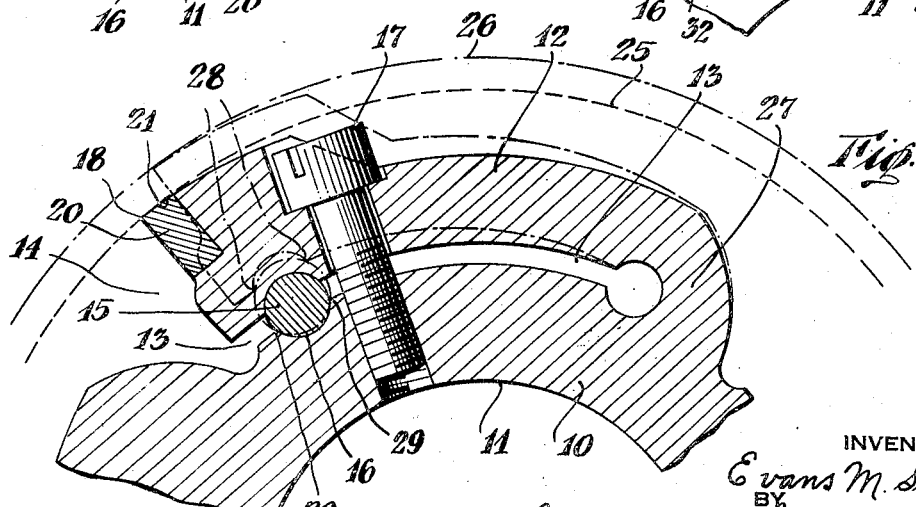
INVENTOR
Evans M. Staples
BY
Watson, Bristol, Johnson & Leavenworth
ATTORNEY Patented Feb. 13, 1940

2,190,492

UNITED STATES PATENT OFFICE 2,190,492

EXPANSIBLE CUTTER

Evans M. Staples, Cincinnati, Ohio

Application July 15, 1938, Serial No. 219,310

6 Claims. (Cl. 77—75)

This invention relates to rotary cutting tools of the expansible type, particularly of the general character employed in boring or reaming operations. In many operations of this character accurate maintenance of size is an important requisite, and the present invention comprises a construction whereby expansion to increase the diameter likewise operates to increase the clearance for the cutting edges. This is accomplished by the flexing of arm portions carrying the cutter elements at their outer ends and affords, within an ample range, any desired degree of fineness of adjustment. A tool constructed in accordance with this invention posseses in general rigidity and freedom from chatter comparable with a solid type cutter, and at the same time may be expanded in diameter and positively maintained at the desired size.

The invention accordingly comprises the features of construction, combination of elements, and arrangement of parts, which will be exemplified in the construction hereinafter set forth and the scope of which invention will be indicated in the claims.

For a fuller understanding of the nature and objects of the invention reference should be had to the following detailed description taken in connection with the accompanying drawing, in which:

Fig. 1 is a view in elevation of a cutter adapted to be mounted on an arbor;

Fig. 2 is a top or edge view of the cutter shown in Fig. 1;

Fig. 3 shows a rotary cutter of the character having a driving shank;

Fig. 4 is a fragmentary view on an enlarged scale of a portion of the cutter of Fig. 1 illustrating the manner of adjusting the cutter; and Fig. 5 is also a fragmentary view on an enlarged scale showing a portion of the structure of Fig. 4, but with a modified form of wedge pin.

In Fig. 1 I have shown my invention incorporated in a boring or reaming type of tool adapted to be mounted on a suitable arbor. A typical instance would be in the boring of engine cylinders in which the cutter would be mounted on a long arbor with suitable bearing supports. The specific tool selected for illustration includes a main body portion 10 of generally cylindrical form having a central opening 11 adapted to receive a supporting arbor. The body portion is preferably made in one piece and the arm portions 12 which extend successively around the periphery in a generally circumferential direction are developed therefrom by suitable machining operations. Arc-shaped saw cuts 13 approximately concentric with the tool axis and extending from the chip clearance opening 14 provide the separation needed for expansion, while still preserving adequate strength in the arms to transmit power to the cutting edges with the arms substantially in compression and providing ample backing for the cutting edges.

Means for outwardly flexing the respective arms when expansion is desired and for maintaining them in such adjusted position are provided comprising, in the specific form illustrated, taper pins 15 and holes 16 of conforming taper which merge with the saw cuts 13 but extend into the arm portions 12 and the inner solid part of the body 10. Another convenient manner of obtaining the adjustment is by the use of tapered screws and corresponding taper tapped holes. Driving or otherwise forcing the taper pins 15 further into the holes 16 will spring or flex the arms 12 away from the main body portion, as will be described more in detail hereinafter. In the drawings the pins 15 are shown as projecting a substantial distance outwardly from the forward face of the cutter, which represents a typical condition that may be employed in a new tool permitting considerable subsequent outward adjustment of the arms 12. It will be understood, however, that if such projecting ends of the pins would interfere with the operation in a particular type of work, the projecting portions could be eliminated, and after the range of adjustment afforded by the shorter pin had been exhausted the pin could be replaced by one of slightly larger diameter. Lock or clamping means for the arms are provided in the form of one or more screws 17 for each arm, two being shown in Fig. 2, which screws project through holes in the arms 12 and are received in threaded openings in the inner body portion. In normal working condition the clamping screws are tightened to secure the arm 12 in firm engagement with the taper pin 15. The taper pin should be located near the outer free end of the arm in order that the cutting portion of the arm will have rigid support to prevent any decrease in diameter or chatter by springing of the arm. Peripheral cutting edges are shown located at 18, and end or advancing cutting edges at 19.

The construction of the cutter disclosed, including particularly its freedom from chatter and its ability to transmit high power to the cutting edges without distortion of the tool, renders it exceptionally adapted to the use of inserts of special cutting materials, such as the cemented carbides. Inserts 20 of such character are shown incorporated in the specific illustrations of the drawing. These inserts at the periphery are ground to provide a clearance extending back from the edge 18 along the surface 21. The general arrangement of the cutter enables readily the provision of a relatively wide and deep clearance opening 14 for the movement of chips. It will be understood that the cutting edges may be of the same general material as the remaining portion of the arm and integral therewith but suitably treated and hardened to serve the intended function.

In Fig. 3 there is shown another tool of the boring or reaming type, but having a shank portion 22 made unitary with the main body portion 23, either as originally formed or by driving a separately formed shank into a suitable hole in the body portion. In normal operation this tool would be driven from a projecting or overhanging spindle such as that of a drill press. In the tool of Fig. 3 one clamp screw 17 only is shown which may be ample in many cases, dependent upon the width of the cutter and other factors.

It is to be understood that by the term boring or reaming type of tool, as used herein, I am referring to a rotary cutting tool of the character used for machining out holes, the diameter of the finished hole corresponding to and being determined by the diameter of the tool itself at the cutting edges. Where there is but a relatively small amount of material to be bored or milled out and the purpose of the operation is primarily to produce a finish in the hole and bring it to an exact size, such operation is more commonly referred to in specific terms as a reaming operation, and the tool itself as a reamer. Because of its rugged character, however, the present tool is fully capable of making a very substantial cut and at the same time producing a straight smooth hole accurately to size. This ability to take a relatively heavy cut within a hole is further enhanced by the large chip clearance area afforded by the general construction.

Having described the general structural features of my invention, I will proceed to a description of the manner of producing an expansion or adjustment thereof and the resultant effects. The most common occasion for this adjustment is to increase the diameter to compensate for wear. Referring to Fig. 4, it may be assumed that the original diameter of the tool and the path of the cutting edge 18 coincides with the circle 25. If it is desired to expand the tool, the set screws 17 are loosened and the taper pin 15 driven down to force the arm 12 outwardly to a position indicated here in dotted lines to the point where the cutting edge 18 lies in the circle 26 concentric with the tool axis. The clamp screws 17 are then tightened to maintain the arm in firm engagement with the supporting taper pin 15. The change in position is somewhat exaggerated to illustrate more clearly the effect. The outward movement of the arm 12 occurs in general about a point indicated approximately by the reference numeral 27. Accordingly, therefore, the clearance along surface 21 is increased. That is to say, the extreme edge 18 will be moved outwardly from the center of the tool a slightly greater distance than the portions of the insert and arm lying between the edge 18 and the supporting center 27. In the previous operation of the tool the wear on the cutting edge will have eliminated some of the original clearance. The effect of the adjustment, however, is to increase or restore the clearance as distinguished from the result in other constructions wherein the cutting blade portion is moved bodily outward in a substantially radial direction. In my prior Patents Nos. 2,093,742 and 2,093,986 granted September 21, 1937, I have disclosed cutters in which I also obtain simultaneously with expansion an increase in clearance. The cutters in my prior patents, however, are of a different type having a substantially unbroken or unslotted shell and the effect is produced in a different manner.

As above described, in my present construction, the cutter blade arms are separated from the main body portion by a long slot and are free to flex outwardly about a center located generally at approximately point 27 near the periphery of the cutter. The actual bending, however, may occur not only at this point but also progressively along the arm 12, the relative extent of the flexing at various points being dependent upon the particular proportions or thicknesses of metal selected. In general the more flexing that occurs in the arm proper between the point 27 and the cutting edge 18, the more the clearance will be increased. Although I have described the arm as being flexed, it will be understood that it is relatively thick and stiff in character but capable of being flexed by reason of the exceptional mechanical advantage afforded by the taper pin 15 located remote from the center 27. Since the taper pin 15 is relatively close to the outer end of the arm, and furthermore since the arm at this point is of even greater thickness, there is no flexing of the arm, when adjusted and clamped, under any normal cutting forces to which the tool is subjected. After the desired adjustment has been made the clamp screw means 17 serve to bring the surfaces into firm engagement eliminating any subsequent displacement under cutting action.

The relatively long arm 12 and saw cut 13 enable a substantial range of adjustment. This range of expansion of the tool may be increased by the substitution of larger pins as the cutting edges are worn away, or greater expansion is desired for any reason. With a normal taper pin and a plain taper hole, as the taper pin is advanced the curvature of the pin and hole will not exactly correspond and the taper pin will make contact along the edges of the arc shaped channels opening into the saw cut 13 as shown in Fig. 4 at 28 and 29. This figure illustrates in exaggerated form an extreme degree of expansion, and the condition noted above is correspondingly greatly exaggerated. In some cases, particularly where the expansion reaches a relatively large amount, a pin of the character illustrated in Fig. 5 may be employed. This comprises a wedge-shaped pin 30 having flat sides 31 and with the edges 32 provided with a curvature or radius modified as desired under the circumstances so that the contacting surfaces of the pin and taper opening conform exactly or more nearly so.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. A boring or reaming tool comprising a substantially cylindrical supporting body having a plurality of circumferentially spaced arms provided with cutting blade edges, said arms extending in a generally circumferential direction and being rigidly connected at the base of the arms to the main body portion but adapted to flex outwardly to a limited extent; a taper pin wedging means for each of said arms for flexing the free ends thereof outwardly independently of each other with respect to the support at the base and said taper pin means acting also in each case to support the respective arm in such adjusted position thereby to increase the cutting diameter of the tool and to increase simultaneously the clearance for the cutting edges; and means for clamping each of said arms in selected adjusted position.

2. An expansible rotary tool of the boring or reaming type comprising a substantially cylindrical body having a plurality of spaced arms rigidly connected to the main body portion with the free ends extending successively in a generally circumferential direction, said arms being provided at the free ends with blade-like cutting elements; a taper pin means for each of said arms located in an opening between the respective arm and the body portion for adjustably wedging the arm outwardly, thereby to increase the cutting diameter and simultaneously the clearance for the respective cutting edges; and means for clamping said arm against said taper pin in any adjusted position.

3. An expansible rotary tool of the boring or reaming type comprising a body portion having a plurality of circumferentially spaced arms connected to the body portion and extending successively in a generally circumferential direction from the respective supporting connection, said arms each being provided at the end with a blade-like peripheral cutting edge; a wedge means for each of said arms located in an opening between the arm and body portion for adjustably flexing the arm outwardly; and screw threaded means extending through each arm into the body portion for releasably clamping the arm in selected adjusted position.

4. In an expansible rotary cutting tool of the boring or reaming type, a substantially cylindrical body portion having a plurality of circumferentially spaced arms connected to the body portion and extending successively in a generally circumferential direction from their respective supporting connection, said connection and arm being of a generally rigid character but adapted to flex to a limited extent under wedging action, each of said arms being provided with a blade-like peripheral cutting edge; taper pin wedging means located between each of said arms and the body portion adjacent the free end for outwardly flexing the arm with respect to its said supporting connection and maintaining the arm in adjusted position; and means for clamping the arm in adjusted position.

5. An expansible rotary cutting tool of the boring or reaming type, comprising a central body portion having a plurality of spaced arms at the periphery rigidly connected to the body portion and extending successively in a generally circumferential direction, said arms being provided at the free ends with cutting edges; independent wedging means for each arm for outwardly springing the free end of the respective arm, said wedging means also acting to support the free end in such selected positions; and independent clamping means for each arm for clamping it in the selected position against its said wedging means.

6. An expansible rotary cutting tool of the boring or reaming type, comprising a central body portion having a plurality of spaced arms at the periphery integrally connected to the body portion and extending successively in a generally circumferential direction and spaced from the body portion except at the supporting connection, said arms being provided at the free ends with cutting edges; wedging means for outwardly springing the free ends of said arms to increase the cutting diameter while maintaining adequate clearance for the cutting edges, said wedging means also acting to support the free ends in such selected positions; and means for directly clamping the arms in such selected position against said wedging means, thereby positively to prevent accidental outward flexing during cutting operations.

EVANS M. STAPLES.